(12) United States Patent
Takano et al.

(10) Patent No.: US 10,718,910 B2
(45) Date of Patent: Jul. 21, 2020

(54) FIELD TERMINATED RUGGEDIZED FIBER OPTIC CONNECTOR SYSTEM

(71) Applicant: SENKO Advanced Components, Inc., Marlborough, MA (US)

(72) Inventors: Kazuyoshi Takano, Southborough, MA (US); Jeffrey Gniadek, Northbridge, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 15/955,811

(22) Filed: Apr. 18, 2018

(65) Prior Publication Data
US 2018/0321447 A1 Nov. 8, 2018

Related U.S. Application Data

(60) Provisional application No. 62/500,599, filed on May 3, 2017.

(51) Int. Cl.
*G02B 6/38* (2006.01)
*G02B 6/36* (2006.01)

(52) U.S. Cl.
CPC ......... *G02B 6/3857* (2013.01); *G02B 6/3807* (2013.01); *G02B 6/3825* (2013.01); *G02B 6/3849* (2013.01); *G02B 6/3802* (2013.01)

(58) Field of Classification Search
CPC .................................................. G02B 6/3857
See application file for complete search history.

(56) References Cited

U.S. PATENT DOCUMENTS

| | | |
|---|---|---|
| 3,614,298 A | 10/1971 | Thompson |
| 3,721,945 A | 3/1973 | Hults |
| 4,150,790 A | 4/1979 | Potter |
| 4,327,964 A | 5/1982 | Haesly et al. |
| 4,447,121 A | 5/1984 | Cooper et al. |
| 4,478,473 A | 10/1984 | Frear |
| 4,545,637 A | 10/1985 | Bosshard et al. |
| 4,557,546 A | 12/1985 | Dreyer |
| 4,607,911 A | 8/1986 | Rhodes |
| 4,616,900 A | 10/1986 | Cairns |
| 4,648,688 A | 3/1987 | Ashman et al. |
| 4,684,161 A | 8/1987 | Egner et al. |
| 4,762,388 A | 8/1988 | Tanaka et al. |
| 4,764,129 A | 8/1988 | Jones et al. |
| 4,795,231 A | 1/1989 | Tanabe |
| 4,840,451 A | 6/1989 | Sampson et al. |

(Continued)

OTHER PUBLICATIONS

International Search Report and Written Opinion for Application No. PCT/US2018/030481, dated Sep. 8, 2018, 11 pages.

*Primary Examiner* — Michelle R Connelly
(74) *Attorney, Agent, or Firm* — Edward S. Jarmolowicz, Esq.

(57) ABSTRACT

Ruggedized field terminated optical fiber connector systems comprising a field terminated connector assembly including a drop cable coupled to a connector, the drop cable having a custom length. The ruggedized field terminated connector system may further comprise a rugged front portion configured to slide over at least a portion of the field terminated connector assembly, and a rear connector body configured to couple to the rugged front portion. The rear body has a crimp ring and a grommet is slide into said crimp ring, and secured therein.

13 Claims, 16 Drawing Sheets

(56) References Cited

U.S. PATENT DOCUMENTS

| | | |
|---|---|---|
| 4,846,544 A | 7/1989 | Bortolin et al. |
| 4,867,523 A | 9/1989 | Scott, Jr. |
| 4,872,736 A | 10/1989 | Myers et al. |
| 4,964,688 A | 10/1990 | Caldwell et al. |
| 4,979,792 A | 12/1990 | Weber et al. |
| 5,041,025 A | 8/1991 | Haitmanek |
| 5,042,891 A | 8/1991 | Mulholland et al. |
| 5,076,656 A | 12/1991 | Briggs et al. |
| D323,143 S | 1/1992 | Ohkura et al. |
| 5,134,677 A | 7/1992 | Leung et al. |
| 5,142,601 A | 8/1992 | Shibata et al. |
| 5,181,267 A | 1/1993 | Gerace et al. |
| 5,202,942 A | 4/1993 | Collins et al. |
| 5,212,752 A | 5/1993 | Stephenson et al. |
| 5,224,187 A | 6/1993 | Davisdon |
| 5,265,181 A | 11/1993 | Chang |
| 5,289,554 A | 2/1994 | Cubukciyan et al. |
| 5,313,540 A | 5/1994 | Ueda et al. |
| 5,317,663 A | 5/1994 | Beard et al. |
| 5,335,301 A | 8/1994 | Newman et al. |
| 5,348,487 A | 9/1994 | Marazzi et al. |
| 5,367,594 A | 11/1994 | Essert et al. |
| 5,371,821 A | 12/1994 | Szegda |
| 5,436,994 A | 7/1995 | Ott et al. |
| 5,444,806 A | 8/1995 | de Marchi et al. |
| 5,469,522 A | 11/1995 | Fan |
| 5,478,970 A | 12/1995 | Lawler et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,682,451 A | 10/1997 | Lee et al. |
| 5,684,903 A | 11/1997 | Kyomasu et al. |
| 5,687,268 A | 11/1997 | Stephenson et al. |
| 5,720,487 A * | 2/1998 | Kato ............... H01R 13/5205 277/637 |
| 5,781,681 A | 7/1998 | Manning |
| 5,809,192 A * | 9/1998 | Manning ............ G02B 6/3843 385/76 |
| 5,845,036 A | 12/1998 | de Marchi |
| 5,915,987 A | 6/1999 | Reed et al. |
| 5,920,669 A | 7/1999 | Knecht et al. |
| 5,923,804 A | 7/1999 | Rosson |
| 5,937,130 A | 8/1999 | Amberg et al. |
| 5,956,444 A | 9/1999 | Duda et al. |
| 5,971,626 A | 10/1999 | Knodell et al. |
| 5,984,533 A | 11/1999 | York |
| 6,041,155 A | 3/2000 | Anderson et al. |
| 6,049,040 A | 4/2000 | Biles et al. |
| 6,134,370 A | 10/2000 | Childers et al. |
| 6,152,609 A | 11/2000 | Dzyck et al. |
| 6,178,283 B1 | 1/2001 | Weigel |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,101 B1 | 5/2001 | Chen et al. |
| 6,238,104 B1 | 5/2001 | Yamakawa et al. |
| 6,247,849 B1 | 6/2001 | Liu |
| 6,250,818 B1 | 6/2001 | Loughlin et al. |
| 6,264,372 B1 | 7/2001 | Pianciola et al. |
| 6,276,840 B1 | 8/2001 | Weiss et al. |
| 6,364,537 B1 | 4/2002 | Maynard |
| 6,461,054 B1 | 10/2002 | Iwase |
| 6,471,412 B1 | 10/2002 | Belenkiy et al. |
| 6,478,472 B1 | 11/2002 | Anderson et al. |
| 6,530,696 B1 | 3/2003 | Ueda et al. |
| 6,551,117 B2 | 4/2003 | Poplawski et al. |
| 6,565,262 B2 | 5/2003 | Childers et al. |
| 6,579,014 B2 | 6/2003 | Melton et al. |
| 6,634,801 B1 | 10/2003 | Waldron et al. |
| 6,648,520 B2 * | 11/2003 | McDonald ............ G02B 6/3869 385/59 |
| 6,668,113 B2 | 12/2003 | Togami et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,785,450 B2 | 8/2004 | Wagman et al. |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,036,993 B2 | 5/2006 | Luther et al. |
| 7,052,186 B1 | 5/2006 | Bates |
| 7,077,576 B2 | 7/2006 | Luther et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,264,402 B2 | 9/2007 | Theuerkorn et al. |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant et al. |
| 7,510,335 B1 | 3/2009 | Su et al. |
| 7,513,695 B1 | 4/2009 | Lin et al. |
| 7,540,666 B2 | 6/2009 | Luther et al. |
| 7,561,775 B2 | 7/2009 | Lin et al. |
| 7,588,373 B1 | 9/2009 | Sato et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,785,019 B2 | 8/2010 | Lewallen et al. |
| 7,824,113 B2 | 11/2010 | Wong et al. |
| 7,837,395 B2 | 11/2010 | Lin et al. |
| 7,881,576 B2 | 2/2011 | Melton et al. |
| D641,708 S | 7/2011 | Yamauchi |
| 7,997,916 B2 * | 8/2011 | Yoshioka ........... H01R 13/5205 439/271 |
| 8,083,450 B1 | 12/2011 | Smith et al. |
| 8,152,385 B2 | 4/2012 | de Jong et al. |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,534,928 B2 | 9/2013 | Cooke et al. |
| 8,556,645 B2 | 10/2013 | Crain |
| 8,559,781 B2 | 10/2013 | Childers et al. |
| 8,622,634 B2 | 1/2014 | Arnold et al. |
| 8,636,424 B2 | 1/2014 | Kuffel et al. |
| 8,651,749 B2 | 2/2014 | Dainese Junior et al. |
| 8,678,670 B2 | 3/2014 | Takahashi et al. |
| 8,727,638 B2 | 5/2014 | Lee et al. |
| 8,770,863 B2 | 7/2014 | Cooke et al. |
| 9,366,829 B2 | 6/2016 | Czosnowski et al. |
| 9,411,110 B2 | 8/2016 | Barnette, Jr. et al. |
| 9,465,172 B2 | 10/2016 | Shih |
| 9,494,744 B2 | 11/2016 | de Jong |

(56) References Cited

U.S. PATENT DOCUMENTS

| | | |
|---|---|---|
| 9,507,099 B2 | 11/2016 | Li et al. |
| 9,548,557 B2 | 1/2017 | Liu |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,599,778 B2 | 3/2017 | Wong et al. |
| 9,658,409 B2 | 5/2017 | Gniadek et al. |
| 9,684,313 B2 | 6/2017 | Chajec |
| 9,709,753 B1 | 7/2017 | Chang et al. |
| 9,778,425 B2 | 10/2017 | Nguyen et al. |
| 9,798,094 B2 | 10/2017 | Kuffel et al. |
| 9,869,825 B2 | 1/2018 | Bailey et al. |
| 2002/0150375 A1* | 10/2002 | Hung .................. G02B 6/4248 385/138 |
| 2002/0172467 A1 | 11/2002 | Anderson et al. |
| 2002/0191919 A1 | 12/2002 | Nolan |
| 2003/0053787 A1 | 3/2003 | Lee |
| 2003/0063862 A1 | 4/2003 | Fillion et al. |
| 2003/0157825 A1 | 8/2003 | Kane |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2004/0247252 A1 | 12/2004 | Ehreneich et al. |
| 2005/0111796 A1 | 5/2005 | Matasek et al. |
| 2005/0141817 A1 | 7/2005 | Yazaki et al. |
| 2006/0013539 A1 | 1/2006 | Thaler et al. |
| 2006/0089049 A1 | 4/2006 | Sedor |
| 2006/0127025 A1 | 6/2006 | Haberman |
| 2006/0140543 A1 | 6/2006 | Abendschein et al. |
| 2006/0160429 A1 | 7/2006 | Dawiedczyk et al. |
| 2006/0269194 A1 | 11/2006 | Luther et al. |
| 2006/0274411 A1 | 12/2006 | Yamauchi |
| 2007/0025665 A1 | 2/2007 | Dean, Jr. et al. |
| 2007/0028409 A1 | 2/2007 | Yamada |
| 2007/0036487 A1 | 2/2007 | Grzegorzewska et al. |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | de Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2009/0220200 A1 | 9/2009 | Sheau Tung Wong et al. |
| 2009/0290938 A1 | 11/2009 | Asaoka et al. |
| 2010/0025992 A1 | 2/2010 | Spence |
| 2010/0034502 A1 | 2/2010 | Lu et al. |
| 2010/0092136 A1 | 4/2010 | Nhep |
| 2010/0239220 A1 | 9/2010 | Lin et al. |
| 2010/0247041 A1 | 9/2010 | Szilagyi |
| 2010/0284656 A1 | 11/2010 | Morra et al. |
| 2010/0322561 A1 | 12/2010 | Lin et al. |
| 2011/0044588 A1 | 2/2011 | Larson et al. |
| 2011/0058773 A1 | 3/2011 | Peterhans et al. |
| 2011/0131801 A1 | 6/2011 | Nelson et al. |
| 2011/0155810 A1 | 6/2011 | Taniguchi et al. |
| 2011/0177710 A1 | 7/2011 | Tobey |
| 2011/0239220 A1 | 9/2011 | Gibson et al. |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2013/0011102 A1* | 1/2013 | Rinzler .................. G02B 6/3813 385/89 |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0170797 A1 | 7/2013 | Ott |
| 2013/0183012 A1 | 7/2013 | Cabanne Lopez et al. |
| 2013/0216185 A1 | 8/2013 | Klavuhn et al. |
| 2013/0259429 A1 | 10/2013 | Czosnowski et al. |
| 2013/0322825 A1 | 12/2013 | Cooke et al. |
| 2014/0016901 A1 | 1/2014 | Lambourn et al. |
| 2014/0023322 A1 | 1/2014 | Gniadek |
| 2014/0050446 A1 | 2/2014 | Chang |
| 2014/0056562 A1 | 2/2014 | Limbert et al. |
| 2014/0086534 A1* | 3/2014 | Lu .................. G02B 6/38 385/60 |
| 2014/0133808 A1 | 5/2014 | Hill et al. |
| 2014/0219621 A1 | 8/2014 | Barnette, Jr. et al. |
| 2014/0226946 A1 | 8/2014 | Cooke et al. |
| 2014/0241678 A1 | 8/2014 | Bringuier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0003784 A1* | 1/2015 | Islam .................. G02B 6/3887 385/62 |
| 2015/0003788 A1 | 1/2015 | Chen et al. |
| 2015/0030289 A1 | 1/2015 | Jiang et al. |
| 2015/0111417 A1 | 4/2015 | Vanderwoud |
| 2015/0212282 A1 | 7/2015 | Lin |
| 2015/0301294 A1 | 10/2015 | Chang et al. |
| 2015/0331201 A1 | 11/2015 | Takano et al. |
| 2015/0355417 A1 | 12/2015 | Takano et al. |
| 2015/0378113 A1 | 12/2015 | Good et al. |
| 2016/0116685 A1 | 4/2016 | Wong et al. |
| 2016/0131849 A1 | 5/2016 | Takano et al. |
| 2016/0172852 A1 | 6/2016 | Tamura et al. |
| 2016/0195682 A1 | 7/2016 | Takano et al. |
| 2016/0259135 A1 | 9/2016 | Gniadek et al. |
| 2016/0266326 A1* | 9/2016 | Gniadek .................. H01R 24/66 |
| 2016/0291262 A1* | 10/2016 | Chang .................. G02B 6/3887 |
| 2016/0320572 A1 | 11/2016 | Gniadek |
| 2016/0349458 A1 | 12/2016 | Murray et al. |
| 2017/0003458 A1 | 1/2017 | Gniadek |
| 2017/0250497 A1* | 8/2017 | Antonini .................. H01R 9/05 |
| 2017/0254966 A1 | 9/2017 | Gniadek et al. |

* cited by examiner

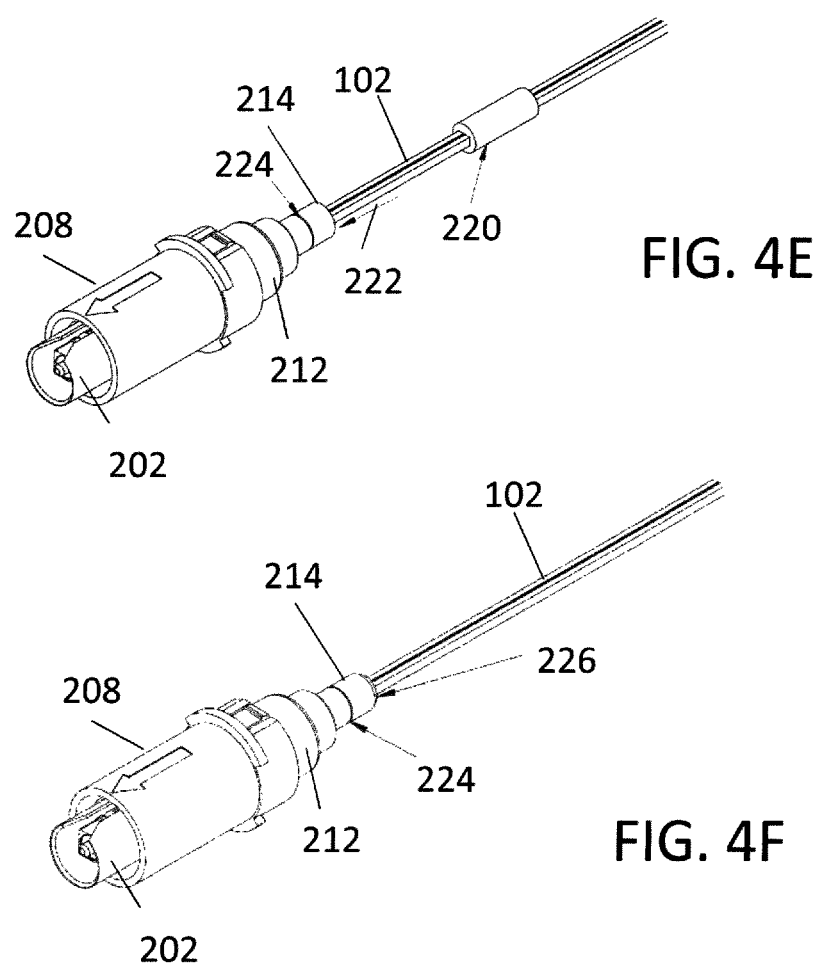

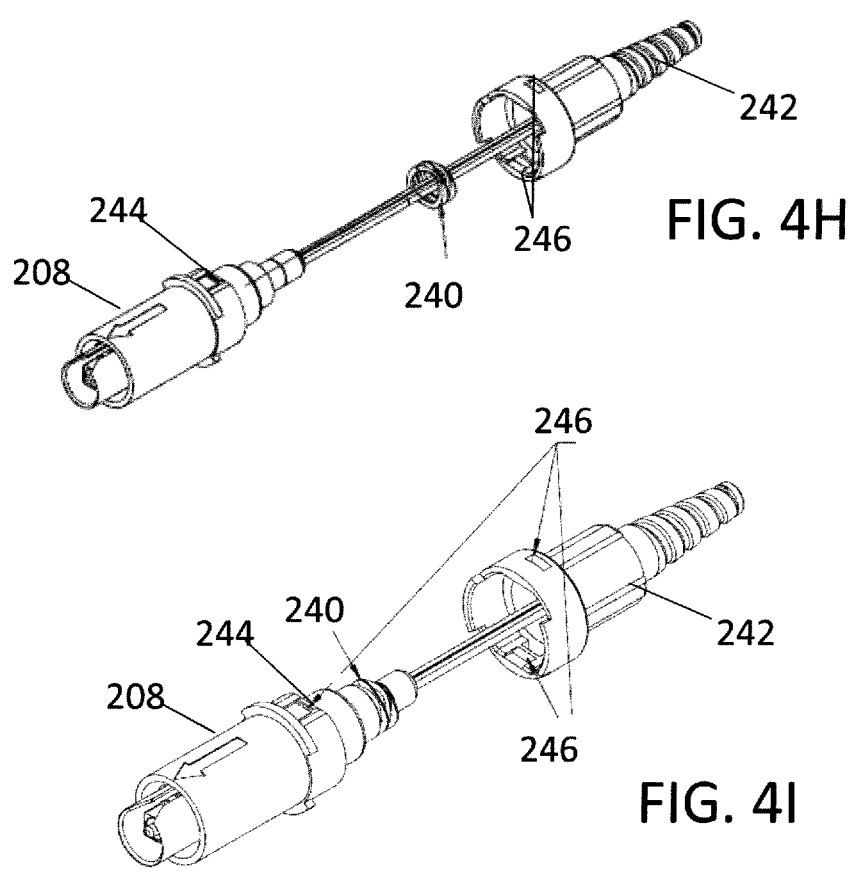

FIELD TERMINATED RUGGEDIZED FIBER OPTIC CONNECTOR SYSTEM

RELATED APPLICATION

This application claims the benefit of priority of U.S. Provisional Application No. 62/500,599 filed on May 3, 2017, entitled "Field Terminated Ruggedized Fiber Optic Connector System", and is included herein by reference in its entirety.

FIELD OF INVENTION

The present disclosure relates generally to optical fiber connectors and systems, and specifically to field terminated and ruggedized optical fiber connectors and systems.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

In external applications wherein the adapters and connectors may be exposed to weather, such as rain or moisture, the connectors may be ruggedized. However, weatherproof ruggedized optical connection cables are factory made, and only in common lengths, and delivered into the field where they are used to extend optical fiber service from a centralized distribution enclosure to a nearby customer. Accordingly, there is a need for ruggedized optical fiber connectors that may be field terminated.

SUMMARY

According to one aspect of the present disclosure, there is provided a ruggedized field terminated optical fiber connector system comprising a field terminated connector assembly including a drop cable coupled to a connector, the drop cable having a custom length. The ruggedized field terminated optical fiber connector system may further comprise a rugged front portion configured to slide over at least a portion of the field terminated connector assembly, and a rear connector body configured to couple to the rugged front portion.

In some embodiments, the ruggedized field terminated optical fiber connector system may have a rear connector body comprising a crimp ring. In some embodiments, the ruggedized field terminated optical fiber connector system may further comprise a grommet configured to be pushed into the crimp ring. In some embodiments, the crimp ring may include a crimp tool alignment mark.

In some embodiments, the ruggedized field terminated optical fiber connector system may further comprise a coupling nut having a front end and a rear end, the rugged front portion protruding from the front end and the rear connector body protruding from the rear end. The ruggedized field terminated optical fiber connector system may further comprise a strain relief member configured to couple to the coupling nut. The strain relief member may be configured to snap on the coupling nut.

In some embodiments, the rear connector body may be configured to snap onto the rugged front portion. The rugged front portion may include at least one sealing member.

According to another aspect, there is provided a ruggedized field terminated optical fiber connector system comprising a field terminated connector assembly having a drop cable coupled to a connector, the drop cable having a custom length. The ruggedized field terminated optical fiber connector system further comprises a connector body configured to be disposed over at least a portion of the field terminated connector assembly, and a clip configured to couple to the connector body.

In some embodiments, the connector body may comprise a connector body tip, and the clip may be configured to couple to the connector body tip. The clip may be configured to snap onto the connector body.

In some embodiments, the rear portion of the connector body may comprise a crimp ring. The ruggedized field terminated optical fiber connector system may further comprise a grommet configured to be pushed into the crimp ring. The crimp ring may include a crimp tool alignment mark.

The ruggedized field terminated optical fiber connector system may further comprise a connector coupling configured to be disposed over at least a portion of the connector body. The connector coupling may comprise a strain relief member. The strain relief member may be disposed at a rear portion of the connector coupling. A tip of the connector body may protrude from a front portion of the connector coupling.

In various embodiments, the field terminated connector assembly may further comprise a cable end adapter configured to receive the drop cable.

The foregoing, as well as additional objects, features and advantages of the present disclosure will be more apparent from the following detailed description, which proceeds with reference to the accompanying drawings.

BRIEF DESCRIPTION OF THE DRAWINGS

FIGS. 4A to 4I illustrate the field termination steps of one embodiment of a ruggedized field terminated optical fiber connector system according to aspects of the present disclosure;

DETAILED DESCRIPTION

Figure 1:
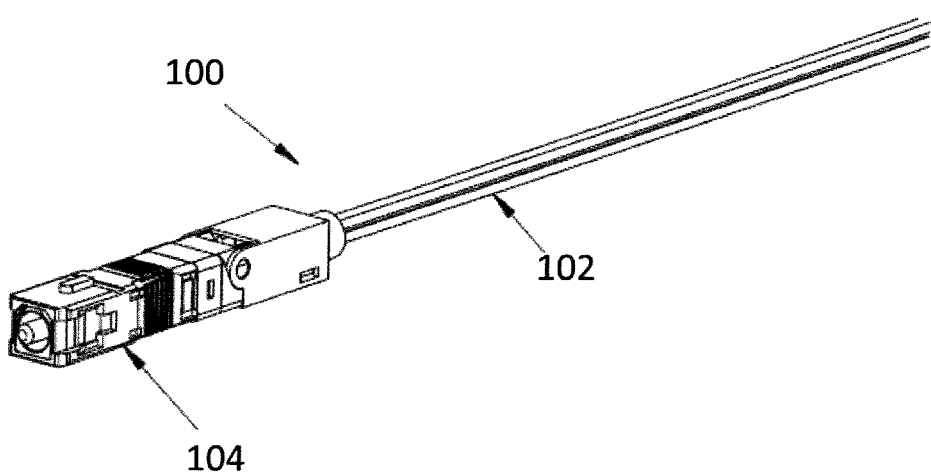
FIG. 1 is a perspective view of a prior art field terminated optical fiber connector system, showing a drop cable terminated by a field installable connector.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors and/or electrical connectors therein to align and connect optical fibers end-to-end, or allow for pin/socket electrical connections.

Various embodiments provide field terminated weatherproof optical drop cable and connector systems using non-ruggedized field installable optical connectors. Various embodiments provide a field terminating system used in the making of optical fiber cables, such as drop cables, to be deployed for "outside plant" (uncontrolled environment) conditions.

Prior weatherproof ruggedized optical connection cables are factory made, only in common lengths, and delivered into the field where they are used to extend optical fiber service from a centralized distribution enclosure to a nearby customer. The cable length chosen to connect these two points may be significantly longer than needed.

Various embodiments address the problem of installing outdoor optical drop cables made in lengths that are always longer than necessary to reach between a centralized distribution point (Fiber Distribution Hub or FDH) and the subscriber's optical network terminal (ONT). Optical network companies and/or hired installation sub-contractors stock selective "standard" optical drop cable lengths in order to provide optical network service to a new subscriber. The chosen cable length from stock needs to be equal to or greater than the minimum calculated distance between FDH and ONT. It is almost always a length that is greater than the measured distance.

Having excess cable length results in extra work for the installer because the installer needs to coil up and store the excess either near the FDH (e.g. on a utility pole) or at the ONT, in some cases at the exterior wall of a building (commercial or residential). Further, even if the drop cable construction is sufficiently flexible to coil up for storage, the minimum bending radius of the cable may be several inches. The result of several coiled up drop cables located close to the FDH can become unsightly. A further disadvantage is the cost of stored drop cable inventories and extra cost of the cable itself when comparing the length from stock and the actual cable length needed for the same job.

Various embodiments disclosed herein allow drop cables to be of custom lengths to suit every drop cable run perfectly. Thus, various embodiments may be used in the field to build the perfect cable length (no excess) to span the distance between the FDH and the ONT.

Advantages of embodiments disclosed herein include reducing installer effort, and the costs associated with the excess cable length and inventories. Another advantage is to greatly improve the looks of the installation because looped excess cable is eliminated.

Furthermore, various embodiments improve drop cable repairs. If a drop cable becomes irreparably damaged, the general approach is to replace the entire drop cable. Embodiments disclosed herein may be used to simply replace the failed connector of an existing drop cable. The "bad" connector is simply cut off, a minimal length of the excess cable is then expertly prepared (for example, stripped, cleaned and cleaved), and the field installable ruggedized connector assembly is added. This is all done at a fraction of the cost for an entire drop cable replacement, including the cost of performing aerial or underground construction.

FIG. 1 shows a prior art field terminated optical fiber connector system 100, including a drop cable 102 terminated by a field installable connector assembly 104. The drop cable 102 is a 2 mm×3 mm rectangle type outdoor rated optical fiber drop cable. However, in various embodiments disclosed herein, other types of drop cables may be used. The connector assembly 104 includes an SC type field installable optical fiber connector. However, in various embodiments disclosed herein, other types of optical fiber connectors may be used.

Figure 2:
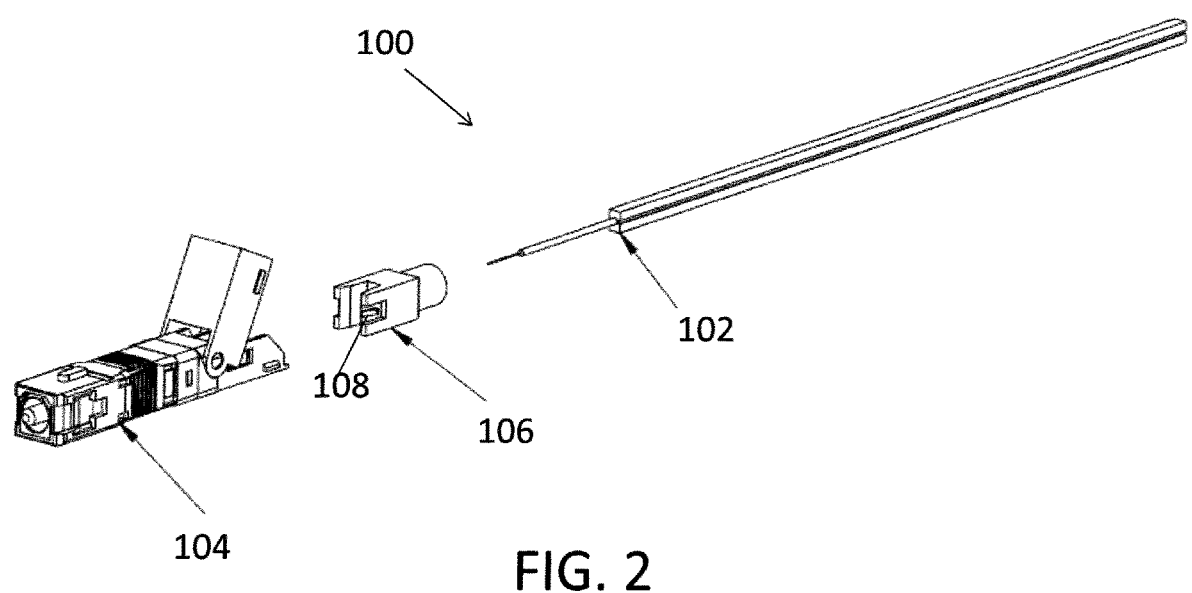
FIG. 2 is an expanded view of the field terminated optical fiber connector system of FIG. 1.

FIG. 2 shows an expanded, disassembled view of the field terminated optical fiber connector system 100. FIG. 2 further shows a cable end adapter 106. The cable end adapter 106 has an internal passage 108 having a size and shape configured to match the size and shape of the drop cable being used, in this case the drop cable 102. Various embodiments of ruggedized optical fiber connector systems configured according to aspects of the present disclosure may include the field terminated optical fiber connector system 100, or other types of optical fiber connector systems.

Figure 3A:
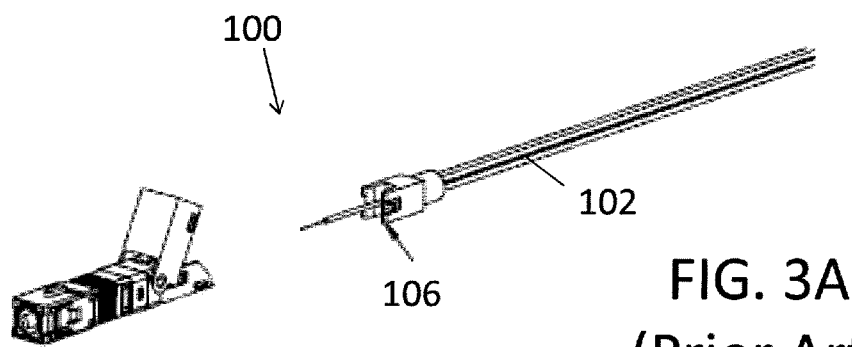
FIGS. 3A to 3D illustrate the field termination steps of the field terminated optical fiber connector system of FIG. 1.
Figure 3B:
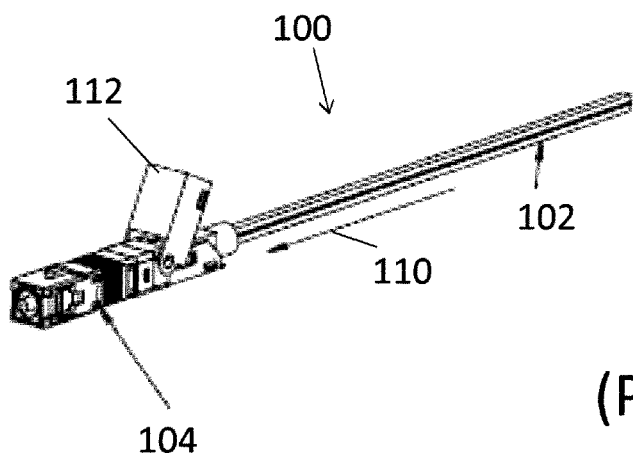
Figure 3C:
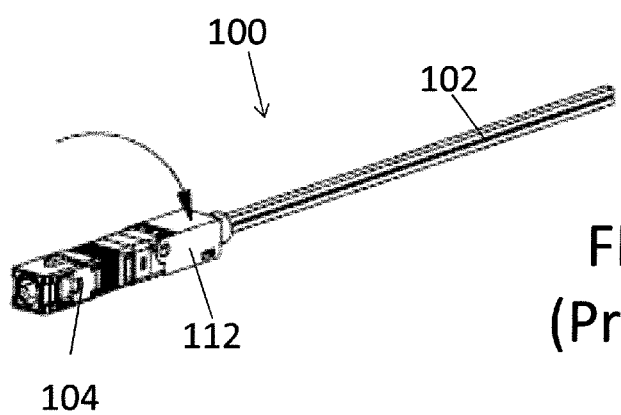

FIGS. 3A to 3D illustrate the field termination steps of the field terminated optical fiber connector system 100. FIG. 3A shows the drop cable 102 coupled to the cable end adapter 106. The cable 102 may then be inserted, in the direction of the arrow 110, into the optical fiber connector assembly 104, as shown in FIG. 3B. Fiber clamping may be performed, for example, per connector installation instructions. The optical fiber connector assembly 104 includes a cover 112 that is closed, as shown for example in FIG. 3C, after the cable end adapter 106 and the cable 102 are received by the connector assembly 104.

Figure 3D:
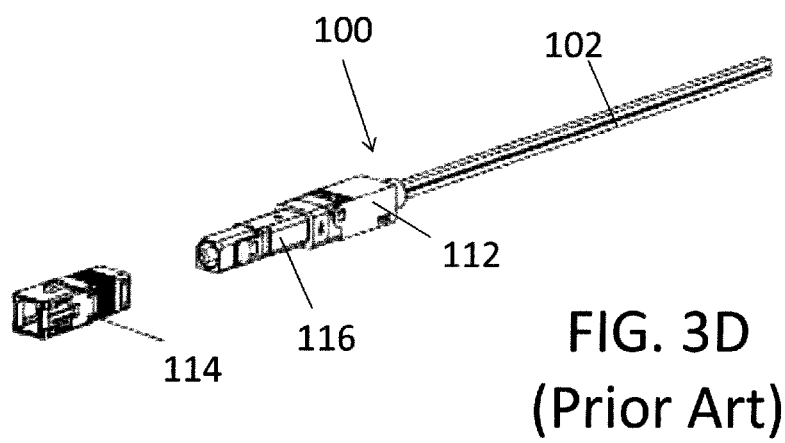

The connector assembly 104 further includes an outer body 114 and a connector 116. As shown in FIG. 3D, the outer body 114 is removed from the connector assembly 114, revealing the connector 116. The connector 116 is an SC type field installable connector, as described above. Other embodiments may use other types of connectors. The outer body 114 may be discarded after removing it from the connector assembly 104. Thus, the outer body 114 is removable and the field terminated optical fiber connector system 100 need not include the outer body 114. In various embodiments disclosed herein, the drop cable is field terminated and may thus have a custom length.

Figure 4A:
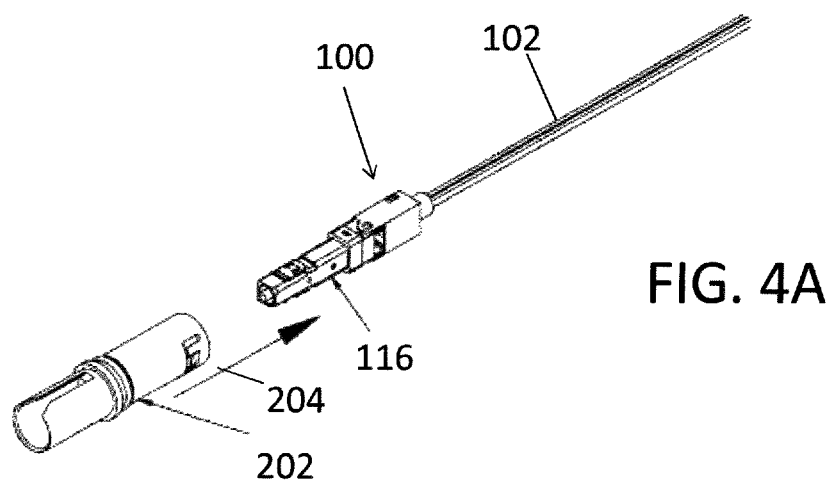
Figure 4B:
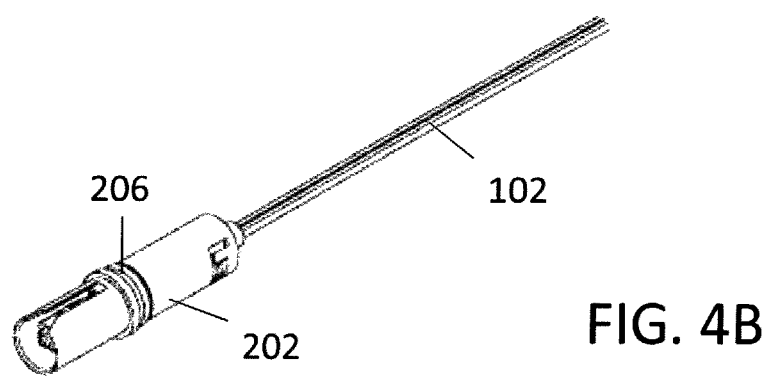
Figure 4C:
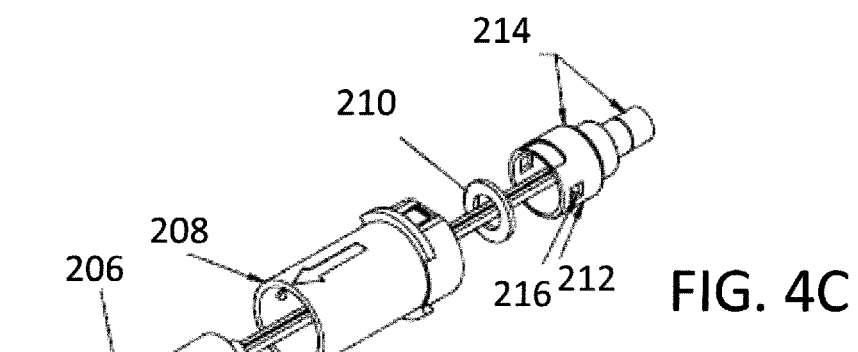
Figure 4D:
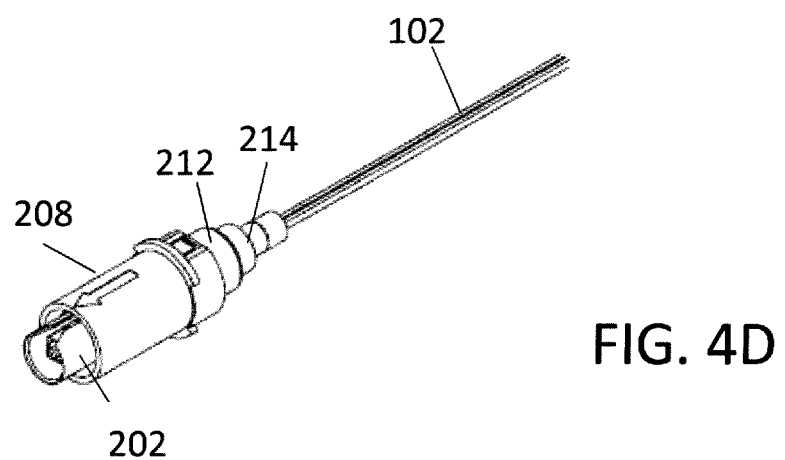
Figure 4G:
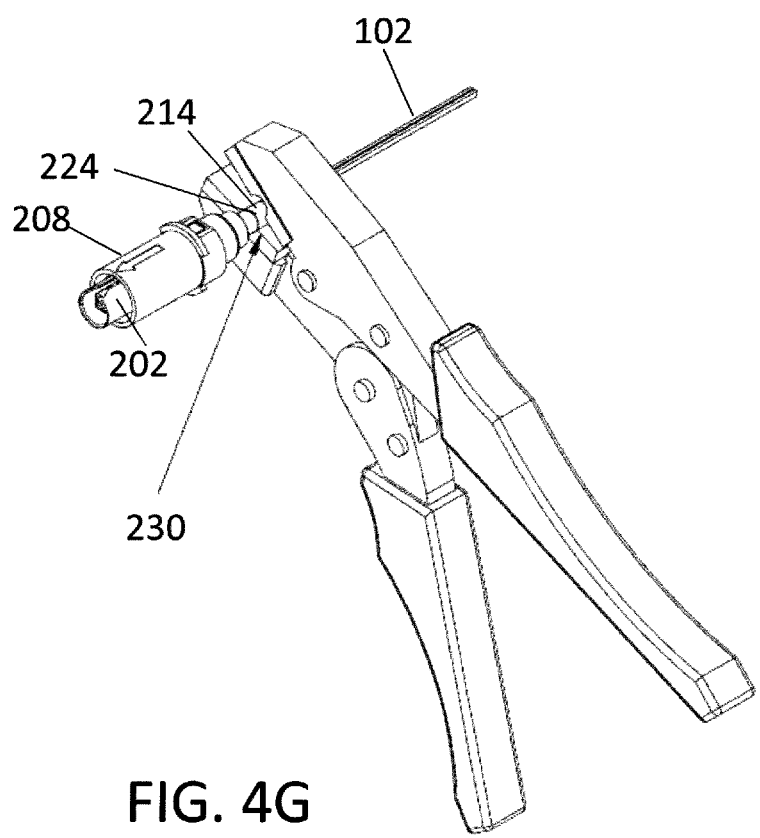
Figure 4J:
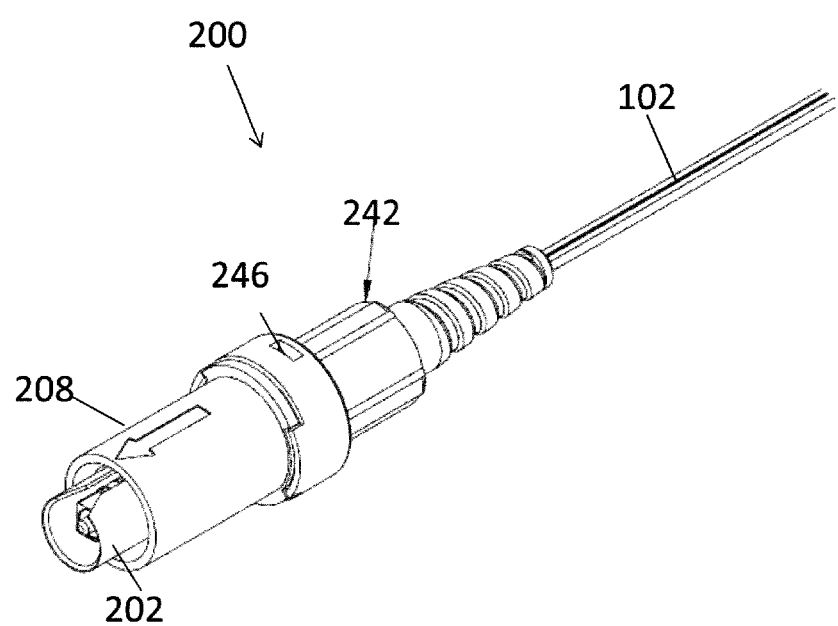
FIG. 4J is a perspective view of the ruggedized field terminated optical fiber connector system assembled as shown in FIGS. 4A to 4I according to aspects of the present disclosure.

FIGS. 4A to 4I illustrate the field termination steps of one embodiment of a ruggedized field terminated optical fiber connector system 200 shown in FIG. 4J. The ruggedized field terminated optical fiber connector system 200 includes the field terminated optical fiber connector system 100 of FIG. 3D, including the connector 116. In other embodiments, other types of connectors, connector assemblies and drop cables may be used.

The ruggedized field terminated optical fiber connector system 200 includes a rugged front portion 202 configured to slide over at least a portion of the field terminated connector system 100, in a rearward direction shown by the arrow 204 in FIG. 4A. FIG. 4B shows a portion of the ruggedized field terminated optical fiber connector system 200, including the rugged front portion 202 covering at least a portion of the connector assembly 114. The rugged front portion 202 includes at least one sealing membrane, such as the O-ring 206.

FIG. 4C shows a portion of the ruggedized field terminated connector system 200, further comprising a slide on coupling nut 208, a slide on sealing washer 210, and a slide on rear connector body 212. The rear connector body 212 includes at least one crimp ring 214. In this embodiment, the rear connector body 212 is made of plastic, with an overmolded soft brass crimp ring 214. In other embodiments, other materials may be used.

The coupling nut 208 is configured to slide over the rugged front portion 202. The sealing washer 210 is configured to slide into the coupling nut 208. The rear connector body 212 is configured to couple to the rugged front portion 202. In this example, the rugged front portion 202 and the rear connector body 212 are configured to couple by at least one snap fit. The rugged front portion 202 includes a protrusion 218, whereas the rear connector body 212 includes an opening 216 configured to receive the protrusion so as to couple the rugged front portion to the rear connector body. In other embodiments, the rear connector body 212 may include the protrusion and the rugged front portion 202 may have a corresponding opening.

FIG. 4D is a perspective view of part of the ruggedized field terminated connector system 200, showing the rugged front portion 202 coupled to the rear connector body 212, and a coupling nut 208 coupled to both the rugged front portion 202 and the rear connector body 212. Sealing members such as the O-ring 206 and the sealing washer 210 further weatherproof the connector system.

FIG. 4E shows the ruggedized connector system 200 further comprises a grommet 220. The grommet 220 may be made of rubber or another material. The grommet is pushed towards the front of the connector system in the direction of the arrow 222, and into the crimp ring 214. In some embodiments, the entire length of the grommet 220 may not fit inside the crimp ring 214. Thus, a portion 226 of the grommet 220 may protrude from the crimp ring 214, as shown for example in FIG. 4F.

In some embodiments, the crimp ring 214 comprises a crimp tool alignment mark 224. As shown in FIG. 4G, a crimp tool 230 may be used to crush the crimp ring 214 onto the rubber grommet 220.

As shown in FIG. 4H, the ruggedized field terminated optical fiber connector system 200 further comprises a wave washer 240 and a strain relief member 242. The wave washer 240 is configured to slide up against the crimp ring 214, as shown in FIG. 4I. The strain relief member 242 is configured to snap to the coupling nut 208. The coupling nut 208 includes at least one tab 244, and the strain relief member 242 includes at least one opening 246 configured to receive a respective tab 244 so as to couple the strain relief member with the coupling nut. In this example, two tabs 244 and two openings 246 are disposed at opposite sides of the strain relief member 242 and the coupling nut 208 to form two snap latches.

FIG. 4J is a perspective view of the ruggedized field terminated optical fiber connector system 200 assembled as shown in FIGS. 4A to 4I according to aspects of the present disclosure. The strain relief member 242 is latched on to the coupling nut 208 using the snap latches. Other embodiments may be configured with more or less components than described and illustrated with reference to FIGS. 4A to 4I.

Figure 5A:
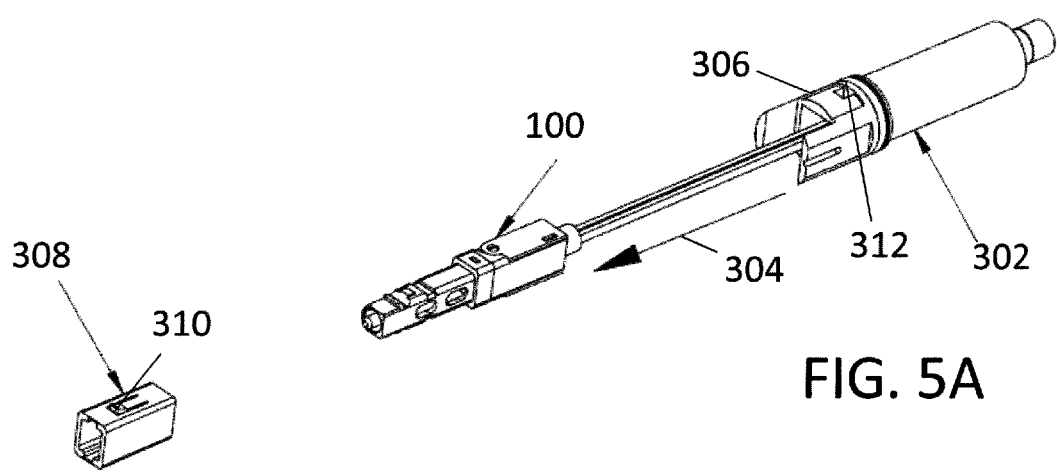
FIGS. 5A to 5G illustrate the field termination steps of another embodiment of a ruggedized field terminated optical fiber connector system according to aspects of the present disclosure.

FIGS. 5A to 5G illustrate the field termination steps of another embodiment of a ruggedized field terminated optical fiber connector system 300 according to aspects of the present disclosure. FIG. 5A shows a part of the ruggedized field terminated connector system 300, comprising the field terminated connector system 100, and further comprising a connector body 302 configured to slide in a longitudinal direction along the arrow 304. The connector body 302 includes a connector body tip 306. The ruggedized field terminated connector system 300 further comprises a connector tip clip 308.

Figure 5B:
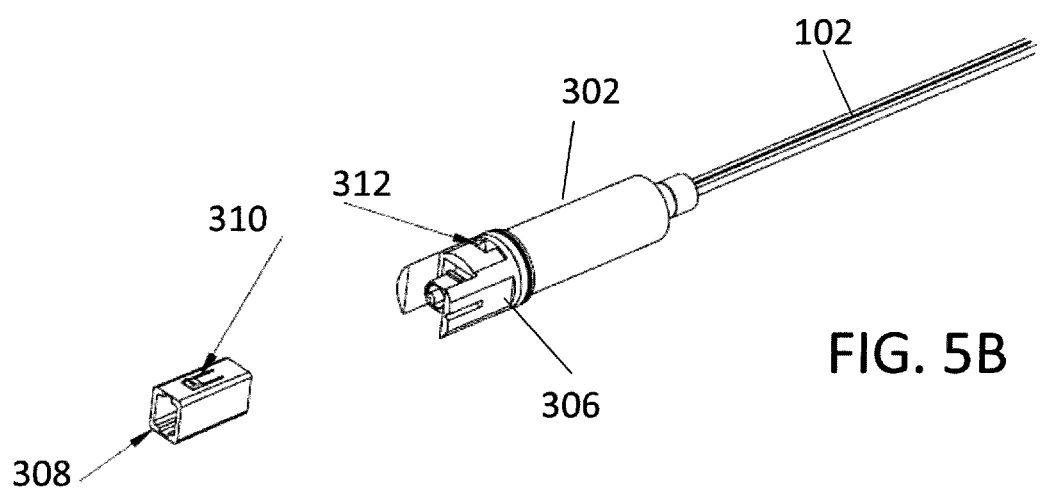
Figure 5C:
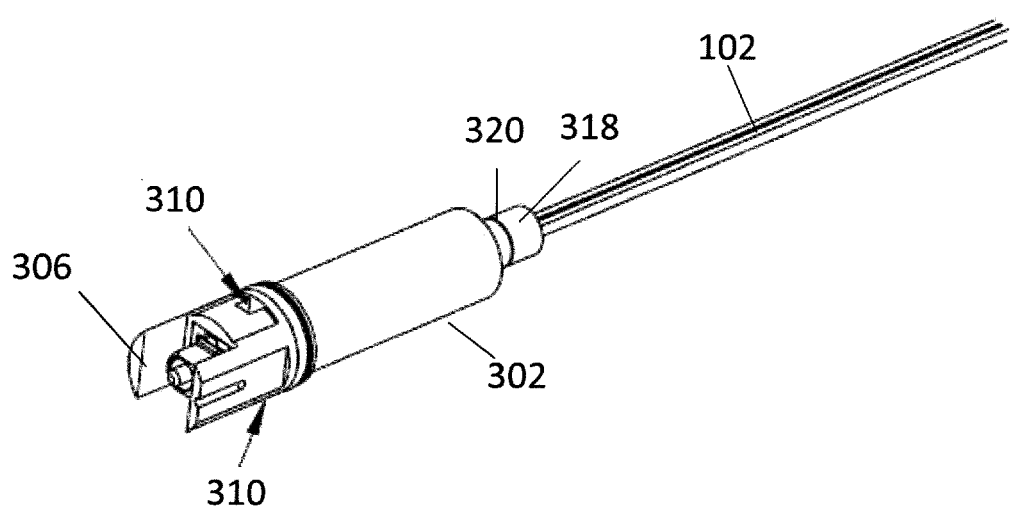

The connector tip clip 308 is configured to couple to the connector body tip 306 as shown in FIG. 5B. The connector tip clip 308 and the connector body tip 306 are configured to snap latch. For example, the connector tip clip 308 includes at least one tab 310 configured to snap into a corresponding opening 312 of the connector body tip 306. In other embodiments, the connector body tip 306 may include a tab and the connector tip clip 308 may include a corresponding opening. In various embodiments, any number of snap latches may be provided to couple the connector tip clip 308 to the connector body tip 306. For example, as shown in FIG. 5C, the connector tip clip 308 is snapped into the connector body tip 306 at two opposite sides of the connector system 300. In this embodiment, the snap is disposed on the connector body tip 306 which is at a front end of the connector body 302. In other embodiments, the snap may be disposed on another portion of the connector body 302.

FIG. 5C further shows the connector body 302 having a crimp ring 318 and a crimp tool alignment mark 320. The crimp ring 318 and the crimp tool alignment mark 320 are disposed at a rear end of the connector body 302, and the connector body tip 306 is disposed at a front end of the connector body.

Figure 5D:
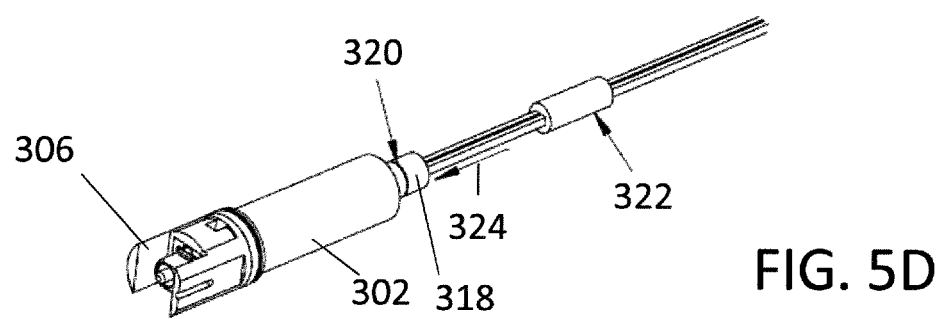
Figure 5E:
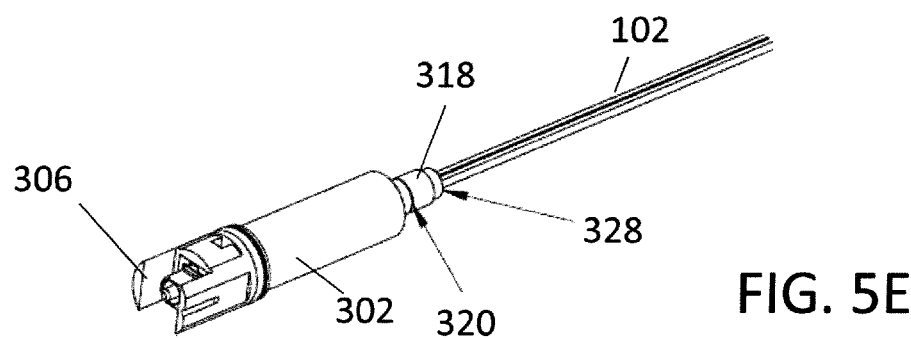

FIG. 5D shows the ruggedized connector system 300 further comprises a grommet 322. The grommet 322 may be made of rubber or another material. The grommet 322 is pushed towards the front of the connector system 300 in the direction of the arrow 324, and into the connector body 302, and specifically into the crimp ring 318. In some embodiments, the entire length of the grommet 322 may not fit inside the connector body 302. Thus, a portion 328 of the grommet 322 may protrude from the rear end of the crimp ring 318, as shown for example in FIG. 5E.

Figure 5F:
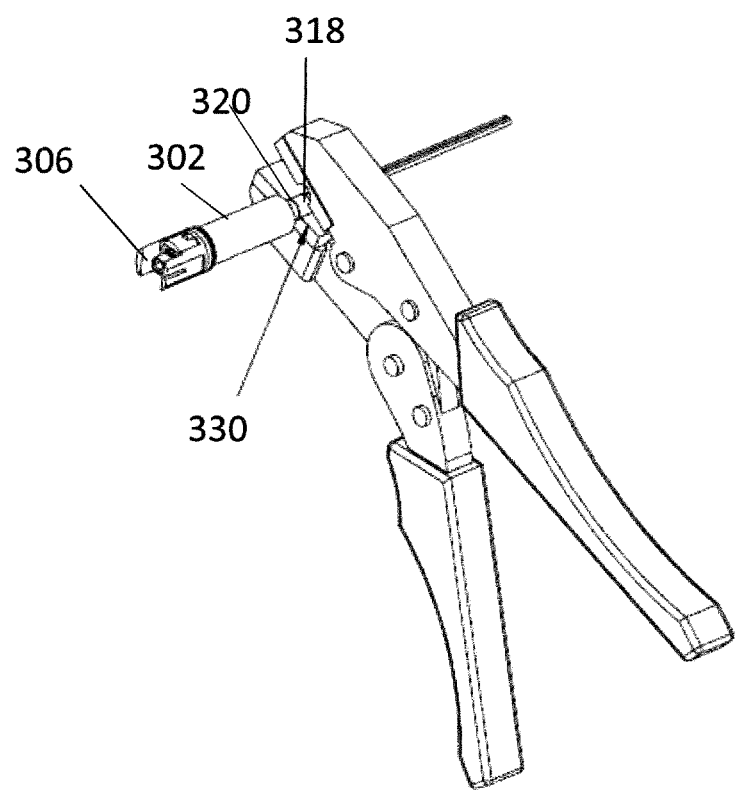

In some embodiments, as described above, the connector body 302 comprises a crimp tool alignment mark 320. Once the grommet 322 is inserted into the crimp ring 318, a crimp tool 330 may be used to crush the crimp ring 318 onto the rubber grommet 322 at the location of the crimp tool alignment mark 320, as shown in FIG. 5F.

Figure 5G:
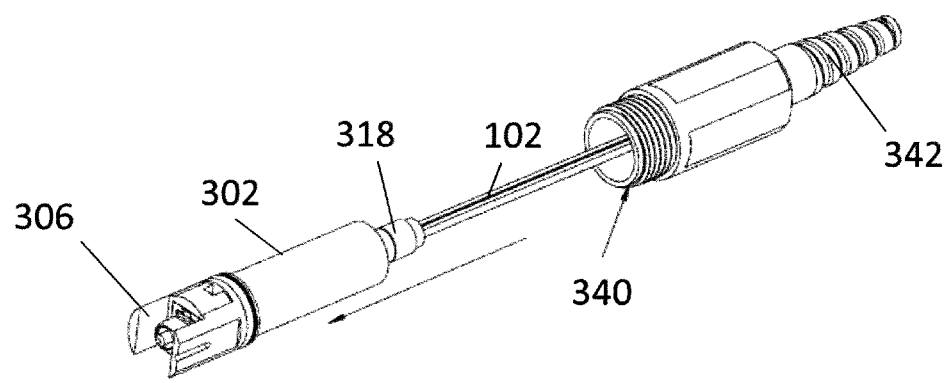

As shown in FIG. 5G, the ruggedized field terminated optical fiber connector system 300 further comprises a connector coupling 340 having a strain relief member 342. The connector coupling 340 is configured to slide onto the connector body 302.

Figure 5H:
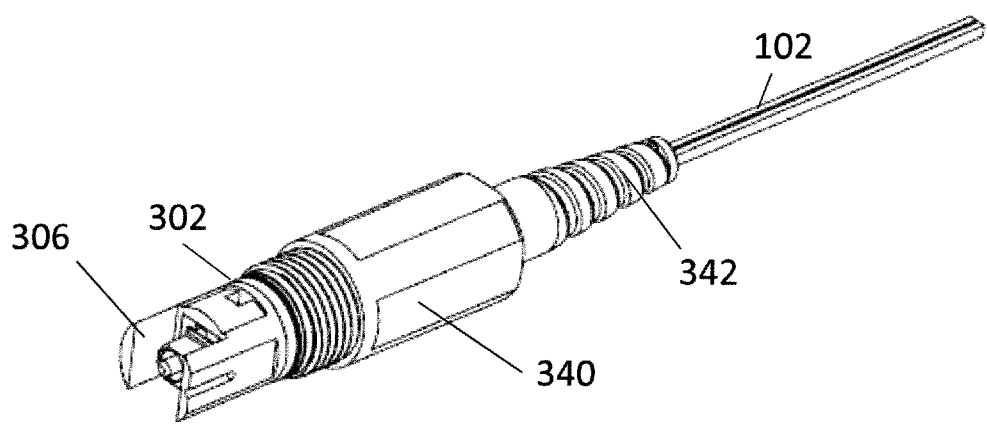
FIG. 5H is a perspective view of the ruggedized field terminated optical fiber connector system assembled as shown in FIGS. 5A to 5G according to aspects of the present disclosure.

FIG. 5H is a perspective view of the ruggedized field terminated optical fiber connector system 300 assembled as shown in FIGS. 5A to 5G according to aspects of the present disclosure. The connector coupling 340 is coupled to the connector body 302 such that the connector body tip 306 protrudes from the front portion of the connector coupling. The strain relief member 342 is positioned at the rear portion of the connector coupling 340. The ruggedized field terminated optical fiber connector system 300 is compatible with Opti-tap connectors by Corning.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A ruggedized field terminated optical fiber connector system comprising:
   a field terminated connector assembly including a drop cable coupled to a connector, the drop cable having a custom length;
   a ruggedized front portion configured to slide over at least a portion of the field terminated connector assembly; and
   a rear connector body configured to slide forward along the drop cable to couple to the ruggedized front portion;
   a crimp ring;
   a grommet;
   wherein the crimp ring is configured to be crimped onto the grommet;
   wherein before the crimp ring is crimped onto the grommet, the crimp ring is integrally connected to the rear connector body such that the crimp ring is configured to move conjointly with the rear connector body as the rear connector body slides forward along the drop cable to couple to the ruggedized front portion; and
   wherein before the crimp ring is crimped onto the grommet, the grommet is movable with respect to the crimp ring and the rear connector body and is configured to be pushed into said crimp ring.

2. The ruggedized field terminated optical fiber connector system of claim 1, wherein the crimp ring includes a crimp tool alignment mark.

3. The ruggedized field terminated optical fiber connector system of claim 1, further comprising a coupling nut having a front end and a rear end, the ruggedized front portion protruding from the front end and the rear connector body protruding from the rear end.

4. The ruggedized field terminated optical fiber connector system of claim 3, further comprising a strain relief member configured to couple to the coupling nut.

5. The ruggedized field terminated optical fiber connector system of claim 4, wherein the strain relief member is configured to snap on the coupling nut.

6. The ruggedized field terminated optical fiber connector system of claim 1, wherein the rear connector body is configured to snap onto the ruggedized front portion.

7. The ruggedized field terminated optical fiber connector system of claim 1, wherein the ruggedized front portion includes at least one sealing member.

8. The ruggedized field terminated optical fiber connector system of claim 1, wherein the crimp ring has an interior and the crimp ring is sized and arranged for receiving at least a portion of the grommet in the interior.

9. The ruggedized field terminated optical fiber connector system of claim 1, wherein the rear connector body is over-molded onto the crimp ring.

10. A ruggedized field terminated optical fiber connector system comprising:
    a field terminated connector assembly having a drop cable coupled to a connector, the drop cable having a custom length;
    a connector body configured to be disposed over at least a portion of the field terminated connector assembly;
    a crimp ring; and
    a grommet;
    wherein the crimp ring is configured to be crimped onto the grommet;
    wherein before the crimp ring is crimped onto the grommet, the crimp ring is integrally connected to a rear portion of the connector body such that the crimp ring and the rear portion of the connector body move together with respect to the field terminated connector assembly as a single part; and
    wherein before the crimp ring is crimped onto the grommet, the grommet is movable with respect to the crimp ring and the rear connector body and is configured to be pushed into said crimp ring.

11. The ruggedized field terminated optical fiber connector system of claim 10, wherein the crimp ring includes a crimp tool alignment mark.

12. The ruggedized field terminated optical fiber connector system of claim 10, wherein the crimp ring has an interior and the crimp ring is sized and arranged for receiving at least a portion of the grommet in the interior.

13. The ruggedized field terminated optical fiber connector system of claim 10, wherein the rear portion of the connector body is over-molded onto the crimp ring.

* * * * *